United States Patent [19]

Lee

[11] Patent Number: 5,760,846
[45] Date of Patent: Jun. 2, 1998

[54] APPARATUS FOR ESTIMATING MOTION VECTORS FOR FEATURE POINTS OF A VIDEO SIGNAL

[75] Inventor: Min-Sup Lee, Seoul, Rep. of Korea

[73] Assignee: Daewoo Electronics Co., Ltd., Seoul, Rep. of Korea

[21] Appl. No.: 579,392

[22] Filed: Dec. 27, 1995

[30] Foreign Application Priority Data

Dec. 29, 1994 [KR] Rep. of Korea ............... 1994-38603

[51] Int. Cl.$^6$ .................. H04N 7/133; H04N 7/12; H04N 7/32
[52] U.S. Cl. ............................ 348/699; 348/416
[58] Field of Search .................. 348/699, 413, 348/401–102, 415–416, 409, 412, 700

[56] References Cited

U.S. PATENT DOCUMENTS

| | | | |
|---|---|---|---|
| 5,537,155 | 7/1996 | O'Connell et al. | 348/699 |
| 5,546,129 | 8/1996 | Lee | 348/416 |
| 5,581,308 | 12/1996 | Lee | 348/699 |
| 5,598,216 | 1/1997 | Lee | 348/416 |
| 5,650,828 | 7/1997 | Lee | 348/625 |

OTHER PUBLICATIONS

Huang, C-L, A New Motion Compensation Method for Image Sequence Coding Using Hierarchical Grid Interpolation, IEEE TC&S, vol. 4, No. 1, pp. :42–51, Feb. 1994.

*Primary Examiner*—Tommy P. Chin
*Assistant Examiner*—David R. Vincent
*Attorney, Agent, or Firm*—Anderson Kill & Olick, P.C.

[57] ABSTRACT

An apparatus for determining a set of motion vectors for a set of feature points located on a contour of a moving object of a video signal comprises a contour displacement detection circuit for detecting a contour displacement range between a previous contour of the moving object contained in the previous frame and a current contour of the moving object contained in the current frame; and a feature point motion estimation circuit for comparing one of feature point blocks, having one of the feature points, with each of candidate blocks derived from a corresponding feature point search region adaptively regulated by the contour displacement range and for assigning a spatial displacements between one of the feature point block and a most similar candidate block thereto as a motion vector for a feature point corresponding to the one to thereby generating the set of motion vectors for the set of feature points.

4 Claims, 4 Drawing Sheets

APPARATUS FOR ESTIMATING MOTION VECTORS FOR FEATURE POINTS OF A VIDEO SIGNAL

FIELD OF THE INVENTION

The present invention relates to a video signal encoding apparatus using a feature point based motion estimation; and, more particularly, to an apparatus capable of accurately estimating motion vectors for feature points of a video signal by using adaptively regulated feature point search regions.

DESCRIPTION OF THE PRIOR ART

As is well known, transmission of digitized video signals can attain video images of a much higher quality than the transmission of analog signals. When an image signal comprising a sequence of image "frames" is expressed in a digital form, a substantial amount of data is generated for transmission, especially in the case of a high definition television system. Since, however, the available frequency bandwidth of a conventional transmission channel is limited, in order to transmit the substantial amounts of digital data therethrough, it is inevitable to compress or reduce the volume of the transmission data. Among various video compression techniques, the so-called hybrid coding technique, which combines temporal and spatial compression techniques together with a statistical coding technique, is known to be most effective.

Most hybrid coding techniques employ a motion compensated DPCM(differential pulse coded modulation), two-dimensional DCT(discrete cosine transform), quantization of DCT coefficients, and VLC(variable length coding). The motion compensated DPCM is a process of estimating the movement of an object between a current frame and a previous frame, and predicting the current frame according to the motion flow of the object to produce a differential signal representing the difference between the current frame and its prediction.

The two-dimensional DCT, which reduces or removes spatial redundancies between image data such as motion compensated DPCM data, converts a block of digital image data, for example, a block of 8×8 pixels, into a set of transform coefficient data. This technique is described in, e.g., Chen and Pratt, "Scene Adaptive Coder", *IEEE Transactions on Communications*, COM-32, No. 3(March 1984). By processing such transform coefficient data with a quantizer, zigzag scanning, and VLC, the amount of data to be transmitted can be effectively compressed.

Specifically, in the motion compensated DPCM, current frame data is predicted from corresponding previous frame data based on an estimation of the motion between the current and the previous frames. Such estimated motion may be described in terms of two dimensional motion vectors representing the displacements of pixels between the previous and the current frames.

There have been two basic approaches to estimate the displacements of pixels: one is a block-by-block estimation and the other is a pixel-by-pixel approach.

In the block-by-block motion estimation, a block in a current frame is compared with blocks in the previous frame until a best match is determined. However, in the block-by-block motion estimation, blocking effect at the boundary of a block may occur in a motion compensation process; and poor estimates may result if all pixels in the block do not move in a same way, to thereby decrease the overall picture quality.

Using a pixel-by-pixel approach, on the other hand, a displacement is determined for each and every pixel. This technique allows a more exact estimation of the pixel value and has the ability to easily handle scale changes (e.g., zooming, movement perpendicular to the image plane). However, in the pixel-by-pixel approach, since a motion vector is determined at each and every pixel, it is virtually impossible to transmit all of the motion vector data to a receiver.

One of the techniques introduced to ameliorate the problem of dealing with the surplus or superfluous transmission data resulting from the pixel-by-pixel approach is a feature point based motion estimation method.

In the feature point based motion estimation technique, motion vectors for a set of selected pixels, i.e., feature points, are transmitted to a receiver, wherein the feature points are defined as pixels of the previous frame or a current frame capable of representing a motion of an object so that motion vectors for pixels of the current frame can be recovered or approximated from those of the feature points in the receiver. In an encoder which adopts the feature point based motion estimation method, disclosed in a commonly owned copending application, U.S. Ser. No. 08/367,520, entitled "Method and Apparatus for Encoding a Video Signal Using Pixel-by-Pixel Motion Estimation", a number of feature points are first selected from all of the pixels contained in the previous frame using a contour detection technique. Then, motion vectors for the selected feature points are determined, wherein each of the motion vectors represents a spatial displacement between one feature point in the previous frame and a corresponding matching point, i.e., a most similar pixel thereto, in the current frame. Specifically, the matching point for each of the feature points is searched in a search region within the current frame, wherein the search region is defined as a region of a predetermined area which encompasses the position of the corresponding feature point.

Even though it is possible to greatly reduce the amount of data to be transmitted through the use of the aforementioned feature point based motion estimation technique, the search region used in estimating motion vectors for feature points is still limited to a predetermined area, which fails to consider the contour displacement range of a moving object. Especially, use of the fixed search region may be undesirable from an accuracy standpoint as the motion vectors for those feature points located on the contour of the moving object may change in accordance with the contour displacement range thereof; and, therefore, false motion vectors may be assigned to the feature points if the actual contour displacement range does not coincide with the fixed search region. And assignment of such false motion vectors may result in a deterioration of the overall coding efficiency.

SUMMARY OF THE INVENTION

It is, therefore, a primary object of the invention to provide an improved feature point motion estimation apparatus for use with a low-bit rate video signal coding system, which is capable of accurately estimating a set of motion vectors for feature points selected from a contour of a moving object in a video signal using adaptively adjusted feature point search regions.

In accordance with the present invention, there is provided an apparatus for determining a set of motion vectors for a set of feature points located on a contour of a moving object in a previous frame of a video signal, wherein each of the motion vectors represents a spatial displacement between one of the feature points and a most similar pixel thereto in a current frame of the video signal, which comprises:

means for detecting a contour displacement range between a previous contour of the moving object contained in the previous frame and a current contour of the moving object contained in the current frame to generate a contour displacement signal;

means for extracting a set of feature point search blocks of an equal size from the previous frame, each of the feature point search blocks having one of the feature points at the center thereof, to sequentially generate the set of feature point search blocks;

means, in response to the contour displacement signal, for determining a feature point search region for each of the feature point search blocks from the current frame to generate a multiplicity of candidate blocks of said equal size derived from the feature point search region, wherein the size of a feature point search region is larger than said equal size of the feature point search blocks; and feature point motion estimation means for comparing one of the feature point search blocks with each of the candidate blocks derived from a corresponding feature point search region and for assigning a spatial displacement between said one of the feature point search block and a most similar candidate block thereto as a motion vector for a feature point corresponding to said one to thereby generate the set of motion vectors for the set of feature points.

BRIEF DESCRIPTION OF THE DRAWINGS

The above and other objects and features of the present invention will become apparent from the following description of preferred embodiments given in conjunction with the accompanying drawings, in which.

DETAILED DESCRIPTION OF THE PREFERRED EMBODIMENTS

Figure 1:
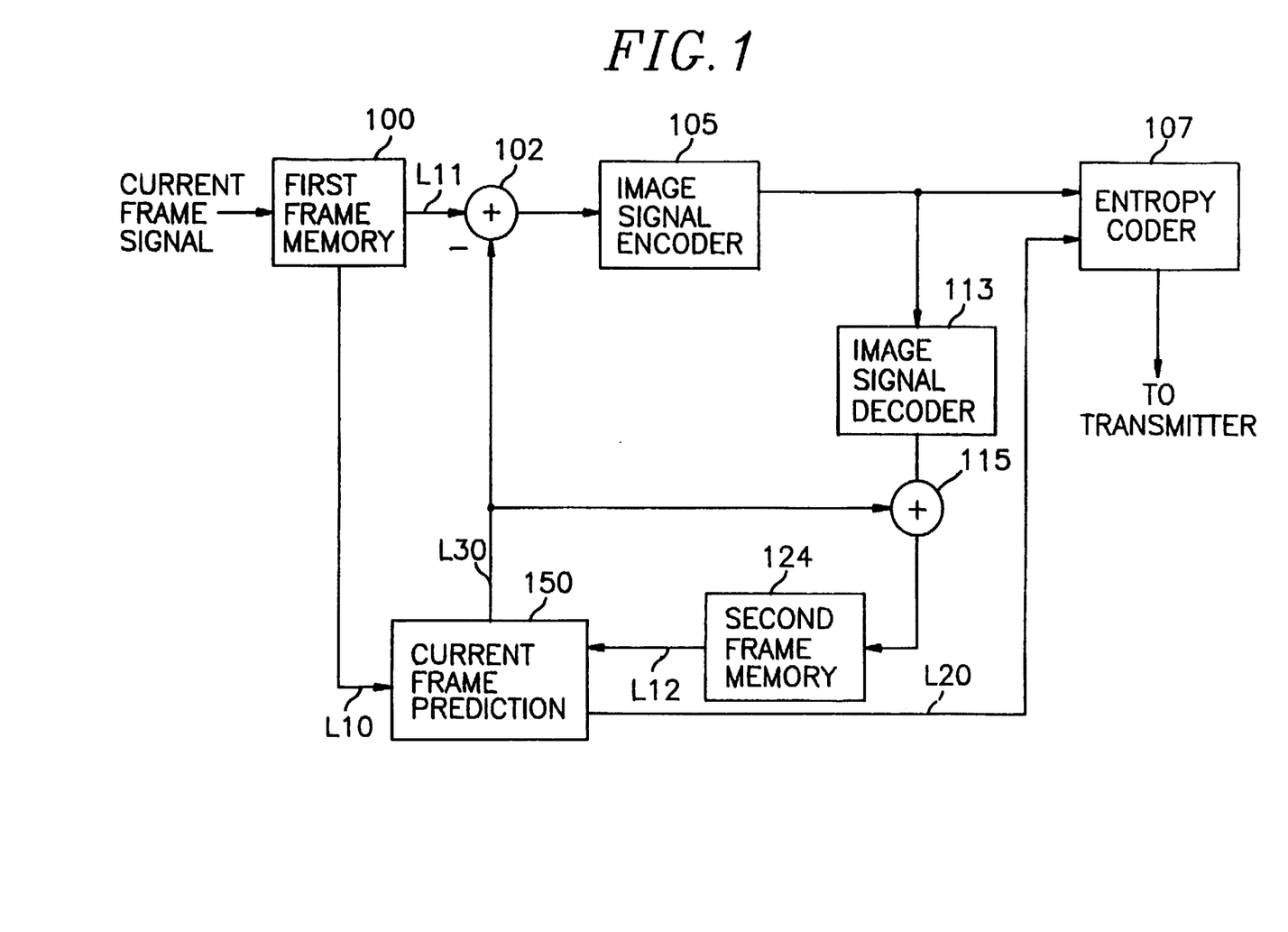
FIG. 1 provides a schematic block diagram of a video signal encoding apparatus using a feature point motion estimation technique.

Referring to FIG. 1, there is shown an encoding apparatus for compressing a digital video signal, which employs a current frame prediction circuit 150 in accordance with the present invention. As shown, current frame data is fed as an input digital video signal to a first frame memory 100 which stores the input digital video signal. The input digital video signal is also coupled to the current frame prediction circuit 150 through a line L10. Actually, the input digital video signal is read, on a block-by-block basis, from the first frame memory 100 and provided to a subtractor 102 through a line L11. The size of each block typically ranges between 8×8 and 32×32 pixels.

The current frame prediction circuit 150 initially serves to determine a set of motion vectors for a set of feature points by using adaptively regulated feature point search regions which will be described hereinafter with reference to FIG. 2, 3 and 4, wherein the feature points are selected from a contour of the moving object in a reconstructed previous frame. After determining the motion vectors for the feature points using a current frame on the line L10 retrieved from the first frame memory 100 and a previous frame on a line L12 from a second frame memory 124, the motion vectors are used for predicting the current frame on a pixel-by-pixel basis in order to generate a predicted current frame onto a line L30. The motion vectors for the entire feature points are also coupled through a line L20 to an entropy coder 107.

The predicted current frame on the line L30 is subtracted from a current frame on the line L11 at the subtractor 102, and the resultant data, i.e., an error signal denoting differential pixel values, is dispatched to an image signal encoder 105. At the image signal encoder 105, the error signal is encoded into a set of quantized transform coefficients, e.g., by using a DCT and any of the known quantization methods. Thereafter, the quantized transform coefficients are transmitted to an entropy coder 107 and an image signal decoder 113.

At the entropy coder 107, the quantized transform coefficients from the image signal encoder 105 and the motion vectors are coded together by using, e.g., a known variable length coding technique, and transmitted to a transmitter(not shown) for the transmission thereof. In the meantime, the image signal decoder 113 converts the quantized transform coefficients from the image signal encoder 105 back into a reconstructed error signal by employing an inverse quantization and an inverse discrete cosine transform. The reconstructed error signal from the image signal decoder 113 and the predicted current frame on the line L30 from the current frame prediction circuit 150 are combined at an adder 115 to thereby provide a reconstructed frame to be stored as a previous frame in the second frame memory 124.

Figure 2:
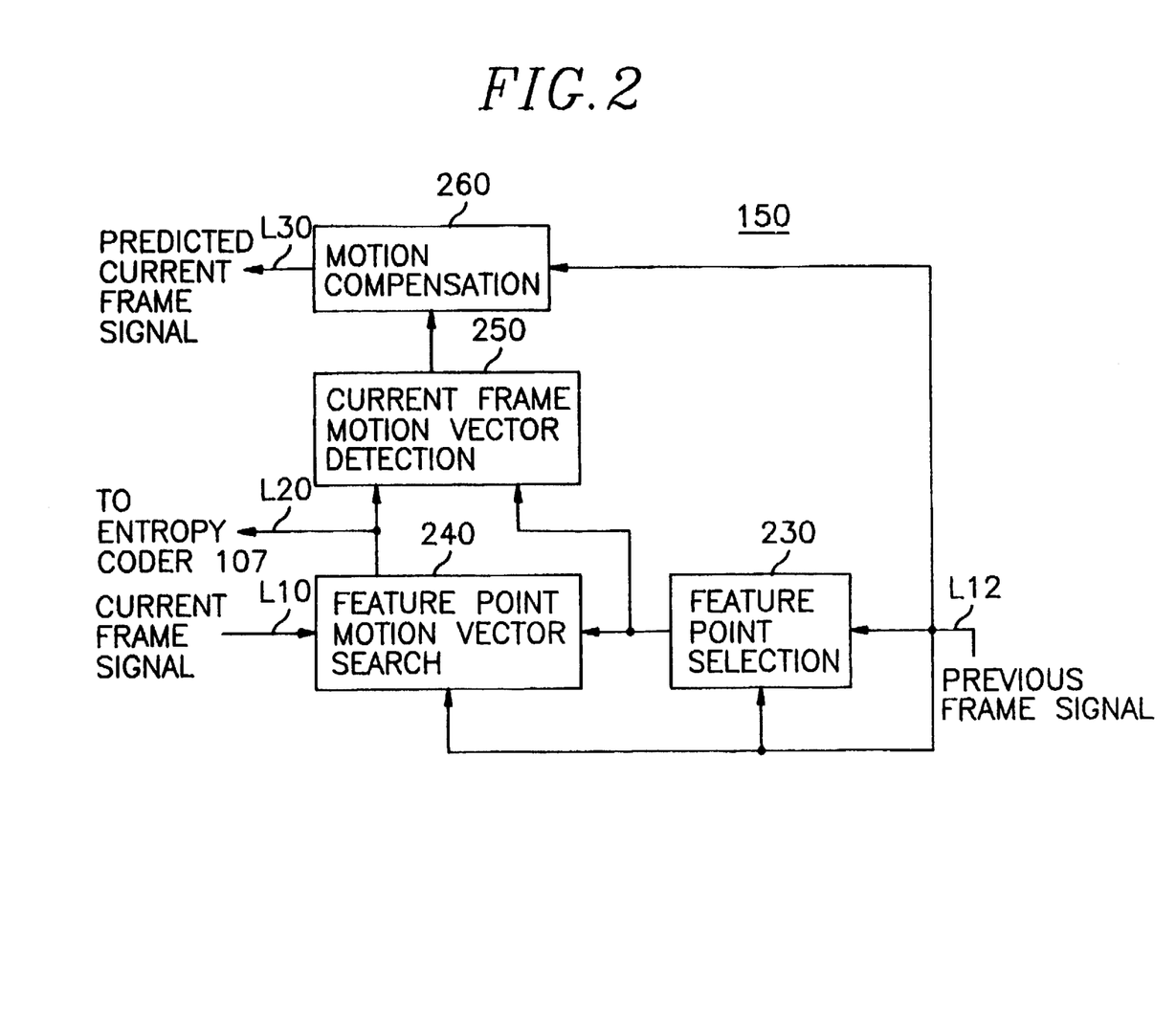
FIG. 2 shows a detailed block diagram of the current frame prediction circuit of FIG. 1.

Referring to FIG. 2, there are illustrated details of the current frame prediction circuit 150 shown in FIG. 1. The current frame prediction circuit 150 is provided with a feature point selection circuit 230, a feature point motion vector search circuit 240, a current frame motion vector detection circuit 250 and a motion compensation circuit 260.

The current frame on the line L10 from the first frame memory 100 and the previous frame on the line L12 from the second frame memory 124 are inputted to the feature point selection circuit 230.

At the feature point selection circuit 230, a number of feature points are selected among the pixels located on a contour of an object contained in the previous frame from the second frame memory 124. The feature points are defined as the pixels which are capable of representing the motion of the moving object in the frame. In a preferred embodiment of the invention, a contour or edge detection technique is employed together with a known grid technique as described in a commonly owned pending application, U.S. Ser. No. 08/367,520. In this scheme, intersection points between a grid and the contour of the object are selected as feature points. The selected feature points from the feature point selection circuit 230 are inputted to the feature point motion vector search circuit 240.

At the feature point motion vector search circuit 240, a first set of motion vectors for the selected feature points is detected based on the current frame on the line 10 and the previous frame on the line 12. Each of the motion vectors in the first set represents a spatial displacement between a feature point in the previous frame and a most similar pixel thereto in the current frame. There are numerous processing algorithms, preferably, a block matching algorithm, available for use to detect the motion vectors on a pixel-by-pixel basis as will be described hereinafter.

At the current frame motion vector detection circuit 250, a second set of motion vectors for all of the pixels contained in the current frame is determined using the first set of motion vectors from the feature point motion vector search circuit 240, the position data of the feature points from the feature point selection circuit 230. In accordance with the preferred embodiment of the present invention, the second set of motion vectors are determined by using a known affine transform. In order to determine the second set of motion vectors, quasi-feature points are determined first, wherein the quasi-feature points represent the pixels of the current frame shifted from the feature points of the previous frame by the first set of motion vectors. After determining the quasi-feature points(QP's), a plurality of non-overlapping polygons, e.g., triangles, are defined by connecting neighboring quasi-feature points as disclosed in a commonly owned pending application, U.S. Ser. No. 08/434,808.

Thereafter, the second set of motion vectors is calculated by using an affine transformation technique. As well known in the art, an arbitrary sequence of rotation, translation and scale changes of a moving object can be represented by the affine transform. As shown, provided from the current frame motion vector detection circuit 250 to the motion compensation circuit 260 is the second set of motion vectors for the pixels of the current frame.

The motion compensation circuit 260 retrieves each value of the pixels to be contained in a predicted current frame from the second frame memory 124 shown in FIG. 1 by using each of the motion vectors contained in the second set, thereby providing the predicted current frame to the subtractor 102 and the adder 115 shown in FIG. 1 via the line L30. In case both components of a motion vector are not integers, the predicted pixel value can be obtained by interpolating the pixels neighboring the position designated by the motion vector.

Figure 3:
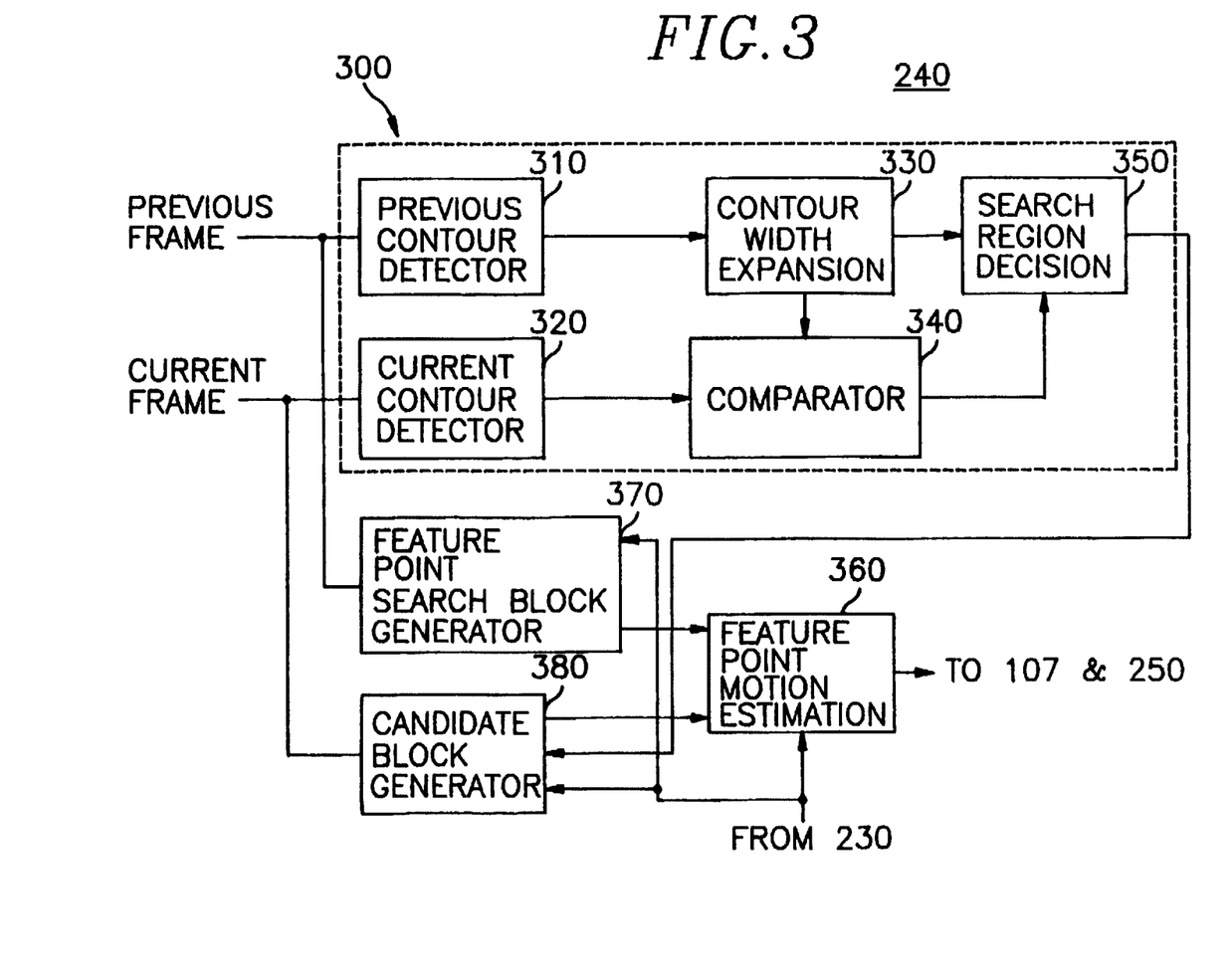
FIG. 3 represents a detailed block diagram of the feature point motion vector search circuit of FIG. 2 in accordance with the present invention.

Referring to FIG. 3, there is illustrated a block diagram, in accordance with the present invention, of the feature point motion vector search circuit 240 depicted in FIG. 2. Both the previous and the current frames from the first and the second frame memories 100 and 124 shown in FIG. 1 are relayed to a contour displacement detection circuit 300. The previous frame is also fed to a feature point search block generator 370 and the current frame is supplied to a candidate block generator 380.

The contour displacement detection circuit 300 includes a previous contour detector 310, a current contour detector 320, a contour width expansion circuit 330, a comparator 340 and a search region decision circuit 350; and detects a displacement range between a previous contour of the moving object contained in the previous frame and a current contour of the moving object contained in the current frame to generate a contour displacement signal.

The previous frame is relayed to the previous contour detector 310 which extracts the previous contour of the moving object from the previous frame by using a known sobel operator and generates a previous contour signal representing positions of the pixels located on the previous contour. Preferably, the width of the extracted previous contour is formed of a single image element, i.e., a pixel. The previous contour signal is then supplied to the contour width expansion circuit 330 which gradually expands the width of the previous contour by a pixel on both sides thereof to obtain a plurality of expanded previous contours, wherein each of the expanded previous contour has a different width. The expended previous contours are sequentially coupled to the comparator 340 and the search region decision circuit 350.

On the other hand, the current frame is relayed to the current contour detection circuit 320 which extracts a current contour of the moving object from the current frame by using a known sobel operator and generates a current contour signal representing the positions of the pixels located on the current contour. Similarly, the width of the extracted previous contour is preferably formed of a single image element, i.e., a pixel. The current contour signal is then supplied to the comparator 340.

The comparator 340 compares the current contour with each of the expanded previous contours and, when an expanded previous contour enclosing or encompassing a predetermined portion of the current contour is selected, generates an expanded previous contour selection signal representing the selected expanded previous contour. In a preferred embodiment of the present invention, the predetermined portion of the current contour can be determined as 95% of all pixel positions thereof. The expanded previous contour selection signal is then relayed to the search region decision circuit 350 which generates a contour displacement signal representing the width of the selected expanded previous contour. The contour displacement signal is coupled, as a contour displacement range, to the candidate block generator 328.

Figure 4A:
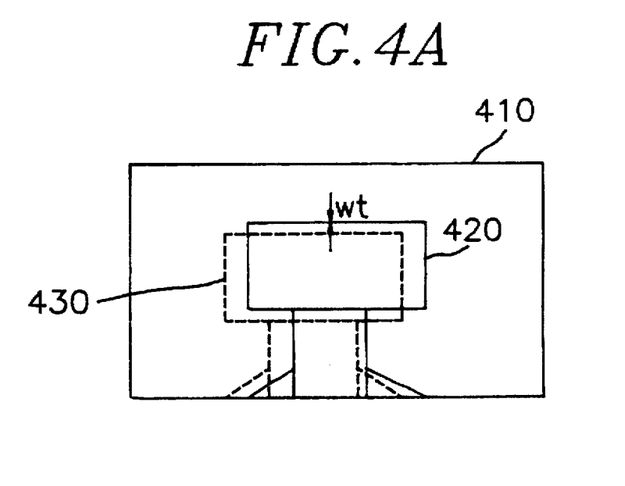
FIGS. 4A and 4B illustrate exemplary diagrams of the contour displacement range detection scheme in accordance with the present invention.
Figure 4B:
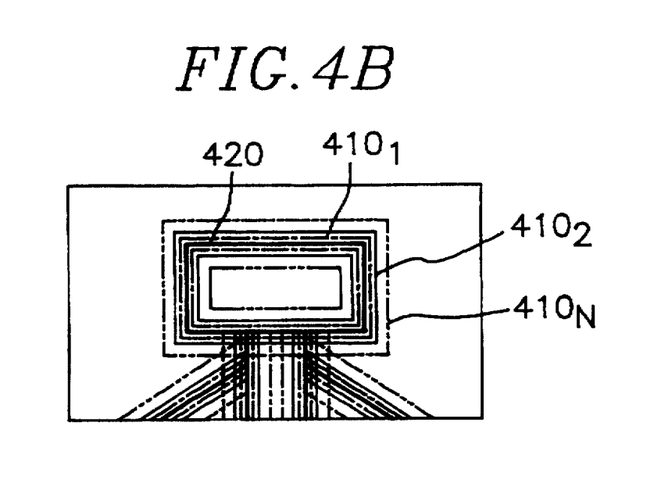

Referring to FIGS. 4A and 4B, there are given exemplary diagrams for illustrating the contour displacement range detection scheme in accordance with the present invention. As shown, two overlapped frames, i.e., the current and the previous frames are generally designated by a reference numeral 410. In this case, the previous contour of a moving object contained in the previous frame is designated by 420 (a solid line) and the current contour of the moving object contained in the current object is represented by 430 (a dot line). The width of the previous contour Wt is formed of a single image element, i.e., a pixel. As shown in FIG. 4B, in order to detect the contour displacement range between the previous and the current contours, the width of the previous contour Wt shown in FIG. 4A is gradually expanded by a pixel position on both sides thereof and a plurality of expanded previous contours $420_1$ to $420_N$ are produced by the contour width expansion circuit 330 shown in FIG. 3, wherein each of the expanded previous contours has a different width thereof and N is a positive integer. As can be seen from FIG. 4B with respect to FIG. 4A, the more the width of the previous contour Wt is expanded, the more the portion of the current contour to be contained in the expanded previous contour is increased. When the predetermined portion, e.g., about 95%, of the current contour is enclosed or encompassed within one of the expanded previous contours, said one of the expanded previous contours can be selected by the comparator 340 shown in FIG. 2 and the width thereof is determined as a contour displacement range.

Referring back to FIG. 3, at the feature point search block generator 370, based on the feature point sequentially inputted from the feature point selection circuit 230, a plurality of feature point search blocks is extracted from the previous frame, wherein the feature point search blocks are formed of an equal size, e.g., 5×5 pixels, having one of the feature points at the center thereof. The feature point search blocks are sequentially fed to the feature point motion estimation circuit 360.

The candidate block generator 380 receives the contour feature point search region for each of the feature points based on the contour displacement range, wherein the size of a feature point search region is larger than the size of a feature point search block. When a corresponding feature point search region for each of the feature points is determined, the candidate block generator 380 generates a multiplicity of candidate blocks derived from the corresponding feature point search region, wherein the size of a candidate block is identical to that of a feature point search block. The candidate blocks are then sequentially coupled to the feature point motion estimation circuit 360.

At the feature point motion estimation circuit 360, a target feature point search block, having a target feature point at the center thereof, is retrieved from the feature point search block generator 370. Thereafter, a motion vector for the target feature point search block is determined after a similarity calculation by using an error function, e.g., MAE (mean absolute error) or MSE(mean square error), between the target feature search point block and each of a plurality of equal-sized candidate blocks included in a corresponding feature point search region, wherein the motion vector represents a displacement between the target feature point search block and a candidate block which yields a minimum error function. The determined motion vector is then set as the motion vector of the target feature point. That is, one of the feature point search blocks is compared with each of the corresponding candidate blocks by using a conventional block matching algorithm; and, when a most similar candidate block to the feature point search block is detected, a spatial displacement between the feature point search block and a most similar candidate block thereto is assigned as a motion vector of the feature point to thereby generate the set of motion vectors for all of the feature points. The motion vectors for the all of the feature points are then applied, as the first set of motion vectors, to the current frame motion vector detection circuit 250 shown in FIG. 2 and the entropy coder 107 shown in FIG. 1 through the line 20.

As can be seen from the above, since the feature point motion vector search apparatus is provided with a contour displacement detection circuit for adaptively regulating the feature point search region for each of the feature point search blocks, the inventive encoder can obtain more accurate motion vectors for the feature points located on a contour of a moving object, thereby improving the coding efficiency.

While the present invention has been shown and described with respect to the particular embodiments, it will be apparent to those skilled in the art that many changes and modifications may be made without departing from the spirit and scope of the invention as defined in the appended claims.

What is claimed is:

1. Apparatus for determining a set of motion vectors for a set of feature points located on a contour of a moving object in a frame of a video signal, comprising:

a detector for detecting a contour displacement range between a previous contour of the moving object contained in a previous frame and a current contour of the moving object contained in a current frame by expanding the previous contour by a pixel position on both sides of the previous contour to generate a contour displacement signal;

an extractor for extracting a set of feature point search blocks of an equal size from the previous frame, each of the feature point search blocks having one of the feature points at the center thereof, to sequentially generate the set of feature point search blocks;

a device for determining a feature point search region composed of a plurality of candidate blocks of equal size for each of the feature point search blocks from the current frame in response to the contour displacement signal, wherein the size of a feature point search region is larger than the size of a feature point search block; and a feature point motion estimator for comparing one of the feature point search block with each of the candidate blocks of a corresponding feature point search region and generating said set of motion vector for the set of feature points, wherein each motion vector represents a spatial displacement between said one of the feature point search blocks and a most similar candidate block.

2. The apparatus of claim 1, wherein the detector includes:

a first contour extraction device for extracting the previous contour of the moving object from the previous frame to generate a previous contour signal representing the positions of pixels located on the previous contour;

a second contour extraction device for extracting the current contour of the moving object from the current frame to generate a current contour signal representing the positions of pixels located on the current contour;

an expansion device for gradually expanding the width of the previous contour by a pixel position in response to said previous contour signal to sequentially generate a plurality of expanded previous contour signals representing a plurality of expanded previous contours, respectively, wherein each of said plurality of expanded previous contours has a different width thereof; and a comparator for comparing the current contour with each of said plurality of expanded previous contours in response to said current contour signal and said plurality of expanded previous contour signals and selecting one of said plurality of expanded previous contours which encompasses a predetermined portion of the current contour to generate the contour displacement signal representing the width of the selected expanded previous contour.

3. A method for detecting a contour displacement range between contours of a moving object contained in frames of a video signal, comprising the steps of:

extracting a previous contour of the moving object from a previous frame to generate a previous contour signal representing the positions of pixels located on said previous contour;

extracting a current contour of the moving object from a current frame to generate a current contour signal representing the positions of pixels located on said current contour;

gradually expanding the width of said previous contour by a pixel position on both sides of said previous contour in accordance with said previous contour signal to sequentially generate a plurality of expanded previous contour signals representing a plurality of expanded previous contours, respectively, wherein each of said plurality of expanded previous contours has a different width thereof;

comparing said current contour with each of said plurality of expanded previous contours in response to said current contour signal and said plurality of expanded previous contour signals and selecting one of said plurality of expanded previous contours which encompasses a predetermined portion of said current contour to generate a contour displacement signal representing the width of the selected expanded previous contour;

determining a feature point search region composed of a plurality of candidate blocks of equal size for each of the feature point search blocks from the current frame in response to the contour displacement signal, wherein the size of a feature point search region is larger than the size of feature point search block.

4. Apparatus for detecting a contour displacement range between contours of a moving object contained in frames of a video signal, comprising:

a first contour extraction device for extracting a previous contour of the moving object from a previous frame to generate a previous contour signal representing the positions of pixels located on said previous contour;

a second contour extraction device for extracting a current contour of the moving object from a current frame to generate a current contour signal representing the positions of pixels located on said current contour;

an expansion device for gradually expanding the width of said previous contour by a pixel position on both sides of said previous contour in accordance with said previous contour signal to sequentially generate a plurality expanded previous contour signals representing a plurality of expanded previous contours, respectively, wherein each of said plurality of expanded previous contours has a different width thereof;

a comparator for comparing said current contour with each of said plurality of expanded previous contours in response to said current contour signal and said plurality of expanded previous contour signals and selecting one of said plurality of expanded previous contours which encompasses a predetermined portion of the current contour to generate a contour displacement signal representing the width of the selected expanded previous contour; and a device for determining a feature point search region composed of a plurality of candidate blocks of equal size for each of the feature point search blocks from the current frame in response to the contour displacement signal, wherein the size of a feature point search region is larger than the size of a feature point search block.

* * * * *

UNITED STATES PATENT AND TRADEMARK OFFICE
CERTIFICATE OF CORRECTION

PATENT NO.  : 5,760,846
DATED       : June 2, 1998
INVENTOR(S) : Min-Sup Lee

It is certified that error appears in the above-indentified patent and that said Letters Patent is hereby corrected as shown below:

On the title page, item:

[30]  Foreign Application Priority Data

Dec. 29, 1994  [KR]   Rep. of Korea         94-38603

Signed and Sealed this

Eleventh Day of August 1998

Attest:

BRUCE LEHMAN

*Attesting Officer*  *Commissioner of Patents and Trademarks*